United States Patent
Patel et al.

(10) Patent No.: US 8,307,235 B2
(45) Date of Patent: Nov. 6, 2012

(54) CROSS CONTROLLER CLOCK SYNCHRONIZATION

(75) Inventors: Kunal H. Patel, Austin, TX (US); Adam C. Ullrich, Austin, TX (US); Kalyanramu Vemishetty, Austin, TX (US); Stephen A. Hanssen, Austin, TX (US)

(73) Assignee: National Instruments Corporation, Austin, TX (US)

( * ) Notice: Subject to any disclaimer, the term of this patent is extended or adjusted under 35 U.S.C. 154(b) by 211 days.

(21) Appl. No.: 12/774,003

(22) Filed: May 5, 2010

(65) Prior Publication Data

US 2011/0276820 A1 Nov. 10, 2011

(51) Int. Cl.
*G06F 1/12* (2006.01)
(52) U.S. Cl. ........ 713/400; 713/501
(58) Field of Classification Search ......... 713/400–401, 713/375, 500–503
See application file for complete search history.

(56) References Cited

U.S. PATENT DOCUMENTS

| | | | |
|---|---|---|---|
| 5,450,458 A * | 9/1995 | Price et al. | 375/356 |
| 5,566,180 A | 10/1996 | Eidson et al. | |
| 5,586,305 A | 12/1996 | Eidson et al. | |
| 5,717,704 A * | 2/1998 | Rosenfeld | 714/736 |
| 5,969,631 A * | 10/1999 | Ammler et al. | 370/514 |
| 6,278,710 B1 | 8/2001 | Eidson | |
| 6,279,124 B1 | 8/2001 | Brouwer et al. | |
| 6,297,760 B1 * | 10/2001 | Hungerbuehler et al. | 341/155 |
| 6,370,159 B1 | 4/2002 | Eidson | |
| 6,663,924 B1 | 12/2003 | Higashino et al. | |
| 7,240,231 B2 * | 7/2007 | Conway | 713/401 |
| 7,263,149 B2 | 8/2007 | Ware et al. | |
| 7,308,062 B2 * | 12/2007 | Joo et al. | 375/356 |
| 7,315,791 B2 | 1/2008 | Ilic et al. | |
| 7,624,294 B2 * | 11/2009 | Conway | 713/400 |
| 7,650,594 B2 | 1/2010 | Nattinger | |
| 2001/0011313 A1 * | 8/2001 | Hungerbuehler et al. | 710/102 |
| 2002/0174311 A1 | 11/2002 | Ware et al. | |
| 2003/0037254 A1 | 2/2003 | Fischer et al. | |
| 2003/0046448 A1 | 3/2003 | Fischer et al. | |
| 2003/0137528 A1 | 7/2003 | Wasserman et al. | |

(Continued)

OTHER PUBLICATIONS

"Non-Transparent Bridging Simplified—Multi-Host System and Intelligent I/O Design with PCI Express"; PLX Technology; 2004; 4 pages.

(Continued)

*Primary Examiner* — Raymond Phan
(74) *Attorney, Agent, or Firm* — Meyertons Hood Kivlin Kowert & Goetzel, P.C.; Jeffrey C. Hood

(57) ABSTRACT

A system may include a plurality of subsystems, e.g. instrumentation units housed in separate chassis, each chassis including multiple instrumentation devices, e.g. data acquisition cards. Each subsystem may generate a local reference clock, which may be phase aligned and locked with respect to one or more similar reference clocks of other subsystems, via a high-level precision time protocol (PTP). Each instrumentation device within a given subsystem may generate its own sample clock based on the local reference clock, and may generate its own trigger clock based on its own sample clock. All trigger clocks may be synchronized with respect to each other through a future time event issued using the PTP, and each instrumentation device may then use its trigger clock to synchronize any received trigger pulses, which may also be issued through future time events using the PTP. This results in synchronizing the received triggers across all participating instrumentation devices across all participating subsystems, ensuring that data acquisition is properly synchronized across the multiple subsystems.

40 Claims, 7 Drawing Sheets

U.S. PATENT DOCUMENTS

| | | | |
|---|---|---|---|
| 2004/0034491 | A1 | 2/2004 | Kim |
| 2004/0064750 | A1 | 4/2004 | Conway |
| 2006/0129776 | A1 | 6/2006 | Ware et al. |
| 2007/0260906 | A1* | 11/2007 | Corredoura .................. 713/400 |
| 2008/0065922 | A1* | 3/2008 | Dour et al. .................. 713/400 |
| 2011/0246809 | A1* | 10/2011 | Dewhirst et al. ............. 713/401 |

OTHER PUBLICATIONS

Jack Regula; "Using Non-Transparent Bridging in PCI Express Systems"; PLX Technology, Inc.; Jun. 1, 2004; 31 pages.

"Ethernet Time Synchronization White Paper—Providing Native Timing Within the Network"; Broadcom Corporation; Oct. 2008; 36 pages.

Sundeep Chandhoke, Lee E. Mohrmann, Adam C. Ullrich, Rodney D. Greenstreet, "Clock Distribution in a Distributed System with Multiple Clock Domains Over a Switched Fabric," U.S. Appl. No. 12/844,248 filed Jul. 27, 2010, 55 pages.

Brandon, "Synchronizing Multiple AD9850/AD9851 DDS-Based Synthesizer", AN-587 Application Note, Analog Devices, 2002, 8 pages.

"Introduction to Distributed Clock Synchronization and the IEEE 1588 Precision Time Protocol," NI Developer Zone, May 14, 2008, http://zone.ni.com/devzone/cda/tut/p/id/2822, 5 pages. (Retrieved Jan. 25, 2010).

T. Debelle, M. Ravindran, and D. Monnier-Bourdin, "Commercial-Off-The-Shelf Technologies for Picosecond Timing and Synchronization," Proceedings of ICALEPCS, WEP064, 2009, 3 pages.

John C. Eidson and Dan Pleasant, "System Timing: Time Scales and IEEE 1588," LXI ConneXion, Oct. 2006, 9 pages.

"National Instruments T-Clock Technology for Timing and Synchronization of Modular Instruments," NI Developer Zone, Oct. 26, 2008, http://zone.ni.com/devzone/cda/tut/p/id/3675, 15 pages. (Retrieved Jan. 25, 2010).

* cited by examiner

CROSS CONTROLLER CLOCK SYNCHRONIZATION

FIELD OF THE INVENTION

This invention relates to signal synchronization, and more specifically to synchronizing timing measurements across multiple systems.

DESCRIPTION OF THE RELATED ART

In many industrial applications (and others), instruments collect data or information from an environment or unit under test (UUT), and may also analyze and process acquired data. Some instruments provide test stimuli to a UUT. Examples of instruments include oscilloscopes, digital multimeters, pressure sensors, arbitrary waveform generators, digital waveform generators, etc. The information that may be collected by respective instruments includes information describing voltage, resistance, distance, velocity, pressure, oscillation frequency, humidity, and/or temperature, among others. Computer-based instrumentation systems typically include transducers for capturing a physical phenomenon and generating a representative electrical signal, signal conditioning logic to perform amplification on the electrical signal, isolation, and/or filtering, and analog-to-digital (A/D) conversion logic for receiving analog signals and providing corresponding digital signals to the host computer system.

In a computer-based system, the instrumentation hardware or device is typically an expansion board plugged into one of the I/O slots of the computer system. In another common instrumentation system configuration, the instrumentation hardware is coupled to the computer system via other means such as through a VXI (VME extensions for Instrumentation) bus, a GPIB (General Purpose Interface Bus), a PXI (PCI extensions for Instrumentation) bus, Ethernet, a serial port or bus, or parallel port of the computer system. The instrumentation hardware may include a DAQ (Data Acquisition) board, a computer-based instrument such as a multimeter, or another type of instrumentation device. In another common system configuration, a chassis and boards inserted in the chassis may operate as a standalone instrument or instrument suite, although in some cases a host computer may be used to configure or program the boards prior to, or during operation.

The instrumentation hardware may be configured and controlled by software executing on a host computer system coupled to the system, or by a controller card installed in the chassis. The software for configuring and controlling the instrumentation system typically includes driver software and the instrumentation application software, or the application. The driver software serves to interface the instrumentation hardware to the application and is typically supplied by the manufacturer of the instrumentation hardware or by a third party software vendor. The application is typically developed by the user of the instrumentation system and is tailored to the particular function that the user intends the instrumentation system to perform. The instrumentation hardware manufacturer or third party software vendor sometimes supplies application software for applications that are common, generic, or straightforward. Instrumentation driver software provides a high-level interface to the operations of the instrumentation device. The instrumentation driver software may operate to configure the instrumentation device for communication with the host system and to initialize hardware and software to a known state. The instrumentation driver software may also maintain a soft copy of the state of the instrument and initiated operations. Further, the instrumentation driver software communicates over the bus to move the device from state to state and to respond to device requests.

In some cases, computerized instrumentation systems include several instrumentation and/or DAQ devices. Each device may generate and/or capture data based on a sampling clock. A sampling clock in this context is typically defined as a periodic electrical signal that controls a function. For example, the sampling clock on an arbitrary waveform generator may drive a DAC (Digital to Analog Converter). Two or more devices may be considered digitally synchronized when their data capture and/or data generation circuits line up within a cycle of the sampling clock. Digital synchronization may occur when the respective sampling clock of each device to be synchronized has substantially the same frequency (e.g. the sampling clocks of the devices may experience instantaneous frequency differences, but on average they may not drift relative to each other). In addition, for digital synchronization, it is preferable for the synchronized devices to have the ability to respond to a trigger within the same period of the sampling clock, and in the case these devices are output devices, to output their data to a connector at substantially the same time. Two clocks are considered to be in phase when their respective measured frequencies are substantially the same, and the two clocks exhibit substantially zero degrees of phase difference with respect to each other. In general, distributed measurement and control systems often require their composite parts to be aligned to the same timebase. One useful result of synchronization in these applications is the sharing of synchronized periodic signals, which can be used to take measurements at the same time or to provide known relationships between control units in a distributed environment.

In certain applications, a single controller is set up to control multiple devices, where the devices can be made to appear as a single device as long as all devices can be triggered by the same signal. However, if each device has a separate trigger condition, it is not easily possible to combine the triggers asserted by the separate trigger conditions to create an integrated system trigger. As a matter of fact, in many systems it is not possible to combine the triggers at all. This problem is compounded when the trigger conditions are temporary, such as a recognizing a digital pattern on a particular piece of data.

Current high performance synchronization technologies may also be limited to a maximum number of total devices, in addition to restricting all devices to be connected to a single controller. For example, in some synchronization systems that operate with internally generated clocks that are synchronized with respect to each other, all devices are required to be connected to a single controller. This limitation exists because the algorithms used by the internally generated clocks require system level knowledge of all the devices in the system. Other technologies, for example high-level protocols such as IEEE-1588, allow for synchronization across controllers, but the performance of these technologies cannot match that of synchronized, internally generated sample clocks.

SUMMARY OF THE INVENTION

In one set of embodiments, a system may include a plurality of subsystems, for example a plurality of instrumentation or measurement subsystems, where each subsystem may be housed in its own separate chassis, and may include multiple components, such as data acquisition (DAQ) cards/board corresponding to various respective instrumentation devices/units. Each subsystem may support the synchronization of triggers—or trigger signals—for multiple instrumentation devices (i.e. for multiple DAQ cards) across multiple subsystems within the system, to ensure that data acquisition is properly synchronized across the multiple subsystems, thus providing consistent, synchronized system-wide data acquisition. Each subsystem may generate a local reference clock signal (local to the subsystem), which may be aligned and locked with respect to one or more similar respective reference clock signals of other subsystems, via a high-level precision time protocol (PTP) such as IEEE-1588 or a global positioning system (GPS) protocol. Each DAQ card (i.e. device) within a given subsystem may generate a local sample clock (local to the DAQ card) based on the local reference signal, and generate a local trigger clock (local to the DAQ card) based on the local sample clock. The trigger clocks may be synchronized with respect to each other, and each DAQ card may then use its trigger clock to synchronize any received trigger (or trigger pulse), resulting in received triggers being synchronized across all participating DAQ cards across all participating subsystems.

In one set of embodiments, the process of synchronizing triggers (trigger pulses or trigger signals) may include transmitting a message to subsystem controllers residing within different respective subsystems (e.g. instrumentation units that include DAQ cards/devices), where the message contains information that details or specifies a point in time corresponding to a future timing event (FTE). For example, the message may be broadcast over a communications medium such as intranet, extranet, or Internet, to some or all subsystem controllers. Each subsystem controller may execute software such as drivers, application software, and/or real-time software, which may result in the subsystem controller automatically responding to receiving the message, and in response to receiving the message, program a corresponding timing and sync controller (TSC) within the same subsystem, to generate an FTE at the point in time that was specified in the message.

The instrumentation devices (subsystems) may include one or more sample clocks that may be used to sample specific signals. The subsystems may also receive one or more trigger signals that deliver trigger pulses to control the starting and/or the stopping of the acquisition of data samples. Furthermore, instrumentation devices within each subsystem may generate one or more trigger clocks (referenced herein as TClk) that may run at a slower frequency relative to the sample clock frequency, and may be used to synchronize the trigger signals between different instrumentation devices. In one set of embodiments, the frequency of the trigger clock (TClk) may be chosen to be the least common multiple of the respective frequencies of all the sample clocks used during data acquisition. In other words, the TClk of an instrumentation device may be phase aligned to one or more sample clocks of the instrumentation device, and the period of TClk may be the least common multiple of the respective periods of all active (used) sample clocks. For example, if the period of a first sampling clock were 0.5 nsec, the period of a second sampling clock were 1 nsec, and the period of a third sampling clock were 0.3 nsec, the period of TClk based on those sample clocks may be chosen as the least common multiple of the those three different periods, that is, 3 nsec.

Accordingly, each rising edge of TClk may be phase aligned to a rising edge of each of the sample clocks. Also, a trigger signal may be generated synchronously to the rising edge of TClk, and may be used to precisely control (e.g., to a single sample clock edge) the acquisition of samples on the instrumentation device. Furthermore, TClks of multiple instrumentation devices may be phase aligned with respect to each other, and in some embodiments the TClks may be configured to run at a common frequency that may be a common multiple (e.g. least common multiple) of the frequencies of all sample clocks used in data acquisition across all subsystems, not just across different instrumentation devices within a given subsystem. Thus, triggers in each of the multiple instrumentation devices in each of the subsystems may be precisely aligned to each other and may be synchronous with respect to TClks (which may be phased-aligned to each other) and may so be used to accurately control the acquisition of data samples in each of the instrumentation devices.

The TClks may be phase-aligned under user control. For example, TClks may be phase aligned prior to performing sample acquisition and TClks may be phase aligned after changes, such as timing changes, for example, have been made to the instrumentation system. In one set of embodiments, TClks are synchronized through a graphical user interface running on a computer, whereby TClks are synchronized first between designated master instrumentation devices, and subsequently the respective TClks of slave instrumentation devices within each subsystem may be phase aligned to the corresponding master instrumentation device in that subsystem.

BRIEF DESCRIPTION OF THE DRAWINGS

A better understanding of embodiments of the present invention can be obtained when the following detailed description of the preferred embodiment is considered in conjunction with the following drawings, in which.

Figure 1:
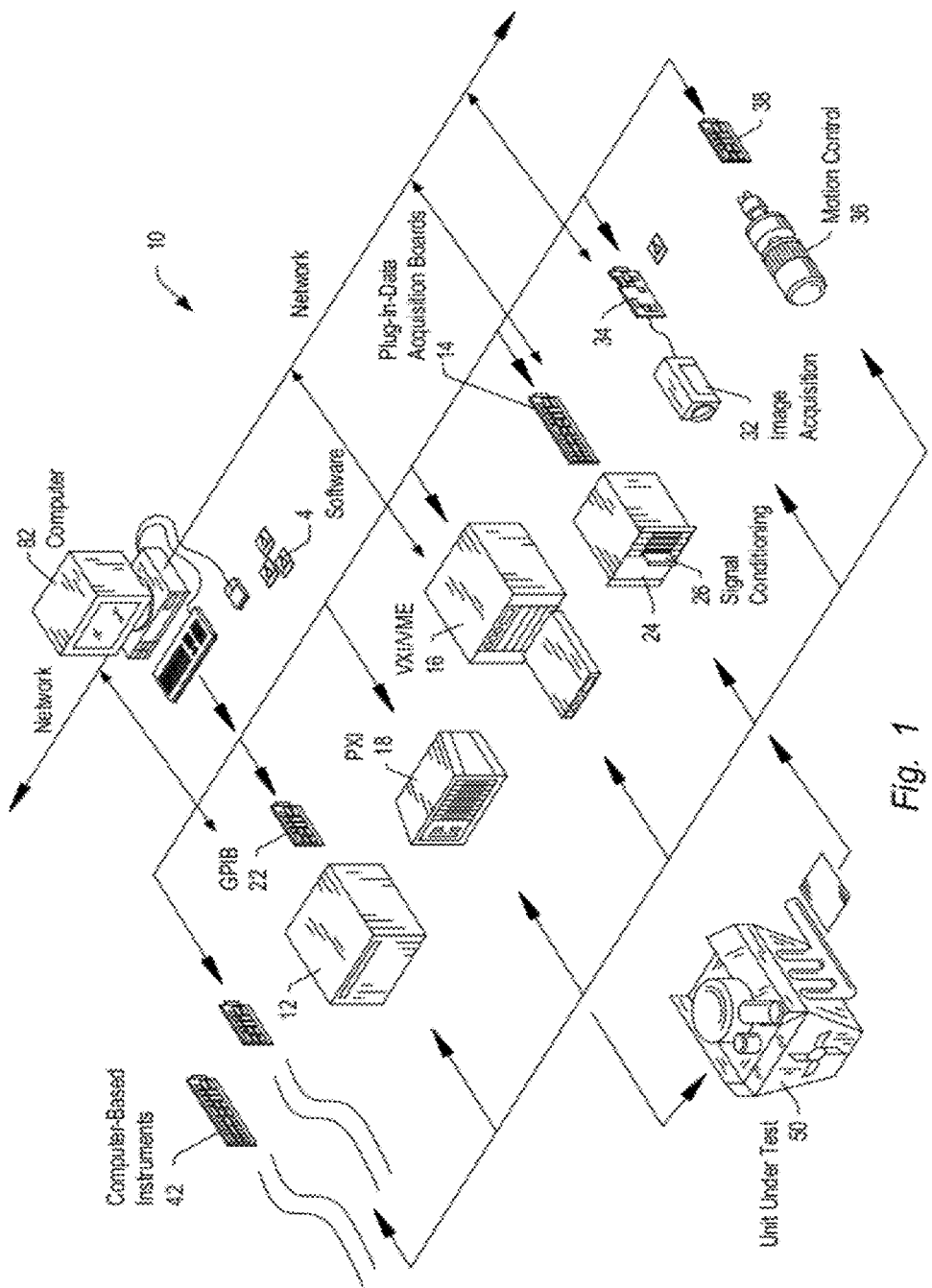
FIG. 1 shows one embodiment of an instrumentation control system with instruments networked together.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

In the following description, numerous specific details are set forth to provide a thorough understanding of various embodiments. However, one of ordinary skill in the art will recognize that these specific details are included for illustrative purposes to provide a better understanding of the overriding principles common to many different possible embodiments. Accordingly, other embodiments featuring details that may differ from the specific details provided herein may perform similar functions to achieve similar goals as the disclosed embodiments, and other embodiments may thus be derived from the specific details and embodiments disclosed herein. In some instances, well-known circuits, structures, and techniques have not been shown in detail to avoid obscuring the novelty of the overriding principles.

Embodiments of the present invention may be used in systems configured to perform test and/or measurement functions, to control and/or model instrumentation or industrial automation hardware, or to model and simulate functions, e.g., modeling or simulating a device or product being developed or tested, etc. However, it is noted that the present invention may equally be used for a variety of applications where synchronization may be required between signals similar to those described herein, and is not limited to the applications enumerated above. In other words, applications discussed in the present description are exemplary only, and the present invention may be used in any of various types of systems. Thus, the system and method of the present invention is operable to be used in any of various types of applications, including the control of other types of devices such as multimedia devices, video devices, audio devices, telephony devices, Internet devices, etc.

FIG. 1 illustrates an exemplary instrumentation control system 10 which may be configured according to embodiments of the present invention. System 10 comprises a host computer 82 which may couple to one or more instruments configured to perform a variety of functions using timing control implemented according to various embodiments of the present invention. Host computer 82 may comprise a CPU, a display screen, memory, and one or more input devices such as a mouse or keyboard as shown. Computer 82 may operate with one or more instruments to analyze, measure, or control a unit under test (UUT) or process 15. The one or more instruments may include a GPIB instrument 12 and associated GPIB interface card 22, a data acquisition board 14 inserted into or otherwise coupled with chassis 24 with associated signal conditioning circuitry 26, a VXI instrument 16, a PXI instrument 18, a video device or camera 32 and associated image acquisition (or machine vision) card 34, a motion control device 36 and associated motion control interface card 38, and/or one or more computer based instrument cards 42, among other types of devices. The computer system may couple to and operate with one or more of these instruments. In some embodiments, the computer system may be coupled to one or more of these instruments via a network connection, such as an Ethernet connection, for example, which may facilitate running a high-level synchronization protocol between the computer system and the coupled instruments, and between coupled instruments themselves. In some embodiments the network connection may be a wireless connection using any of a variety of possible wireless protocols, e.g. WiFi, WiMax, or a GPS protocol among others. The instruments may be coupled to the unit under test (UUT) or process 50, or may be coupled to receive field signals, typically generated by transducers. System 10 may be used in a data acquisition and control applications, in a test and measurement application, an image processing or machine vision application, a process control application, a man-machine interface application, a simulation application, or a hardware-in-the-loop validation application, among others.

Figure 2:
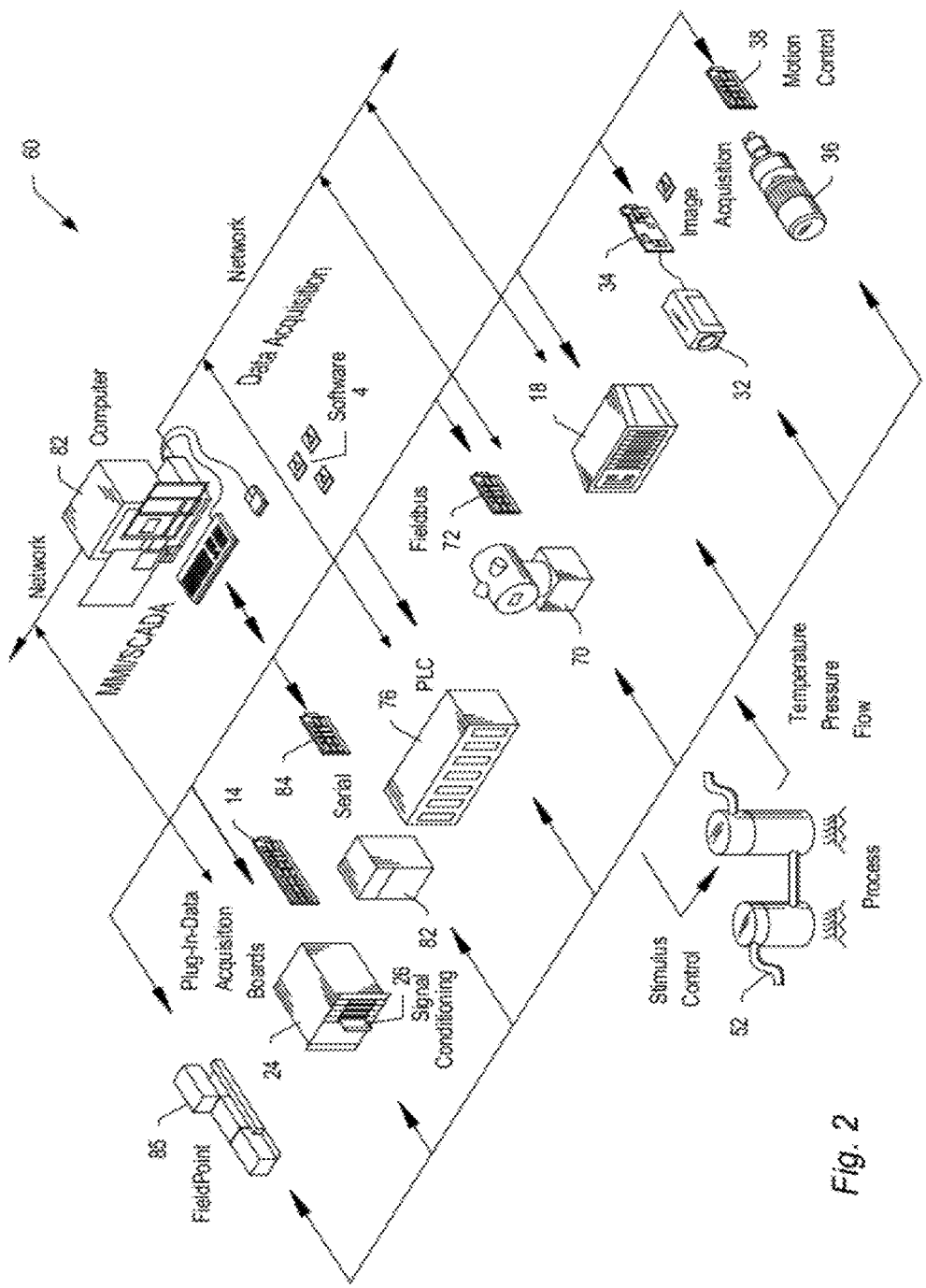
FIG. 2 shows one embodiment of an industrial automation system with instruments networked together.

FIG. 2 illustrates an exemplary industrial automation system 60 that may be configured according to embodiments of the present invention. Industrial automation system 60 may be similar to instrumentation or test and measurement system 10 shown in FIG. 1. Elements that are similar or identical to elements in FIG. 1 have the same reference numerals for convenience. System 60 may comprise a computer 82 which may couple to one or more devices and/or instruments configured to perform a variety of functions using timing control implemented according to various embodiments of the present invention. Computer 82 may comprise a CPU, a display screen, memory, and one or more input devices such as a mouse or keyboard as shown. Computer 82 may operate with the one or more devices and/or instruments to perform an automation function, such as MMI (Man Machine Interface), SCADA (Supervisory Control and Data Acquisition), portable or distributed data acquisition, process control, and advanced analysis, among others, on process or device 52.

The one or more devices may include a data acquisition board 14 inserted into or otherwise coupled with chassis 24 with associated signal conditioning circuitry 26, a PXI instrument 18, a video device 32 and associated image acquisition card 34, a motion control device 36 and associated motion control interface card 38, a field bus device 70 and associated field bus interface card 72, a PLC (Programmable Logic Controller) 76, a serial instrument 82 and associated serial interface card 84, or a distributed data acquisition system, such as the Compact FieldPoint or CompactRIO systems available from National Instruments, among other types of devices. Similar to the system shown in FIG. 1, the computer system and one or more of the instruments/devices may be coupled to each other via a network connection, such as an Ethernet connection (or wireless network connection as mentioned with respect to system 10 in FIG. 1), to facilitate running a high-level synchronization protocol between the computer system and the coupled instruments/devices, and between the various instruments/devices.

In various embodiments disclosed herein, a high-level protocol (e.g. IEEE-1588, GPS, or other similar protocol) is used to align respective local reference signals generated in various instruments/devices, and the aligned respective reference signals are used to generate and distribute synchronized adjustable frequency local periodic signals, which may be used in performing various tasks, such as data acquisition, for example. The high-level protocol may further be used to start the devices at a same point in time through a future time event, to ensure that desired events are synchronized across the various instruments/devices. As shown in FIGS. 1 and 2, the instruments and computer 82 may be coupled together via the Networking connection (e.g. an Ethernet connection or a wireless connection using a protocol such as GPS), which is at least partially used in phase aligning the respective local reference signals with respect to each other, and in facilitating the generation of a future time event to simultaneously start a given function or event in multiple instruments/devices distributed in systems 10 and 60. Please note that actual connectivity of these instruments may differ from that shown in FIGS. 1 and 2, which merely illustrate one possible combination of connections. Alternate embodiments may feature more or less instruments coupled together via the Network connection.

Figure 3:
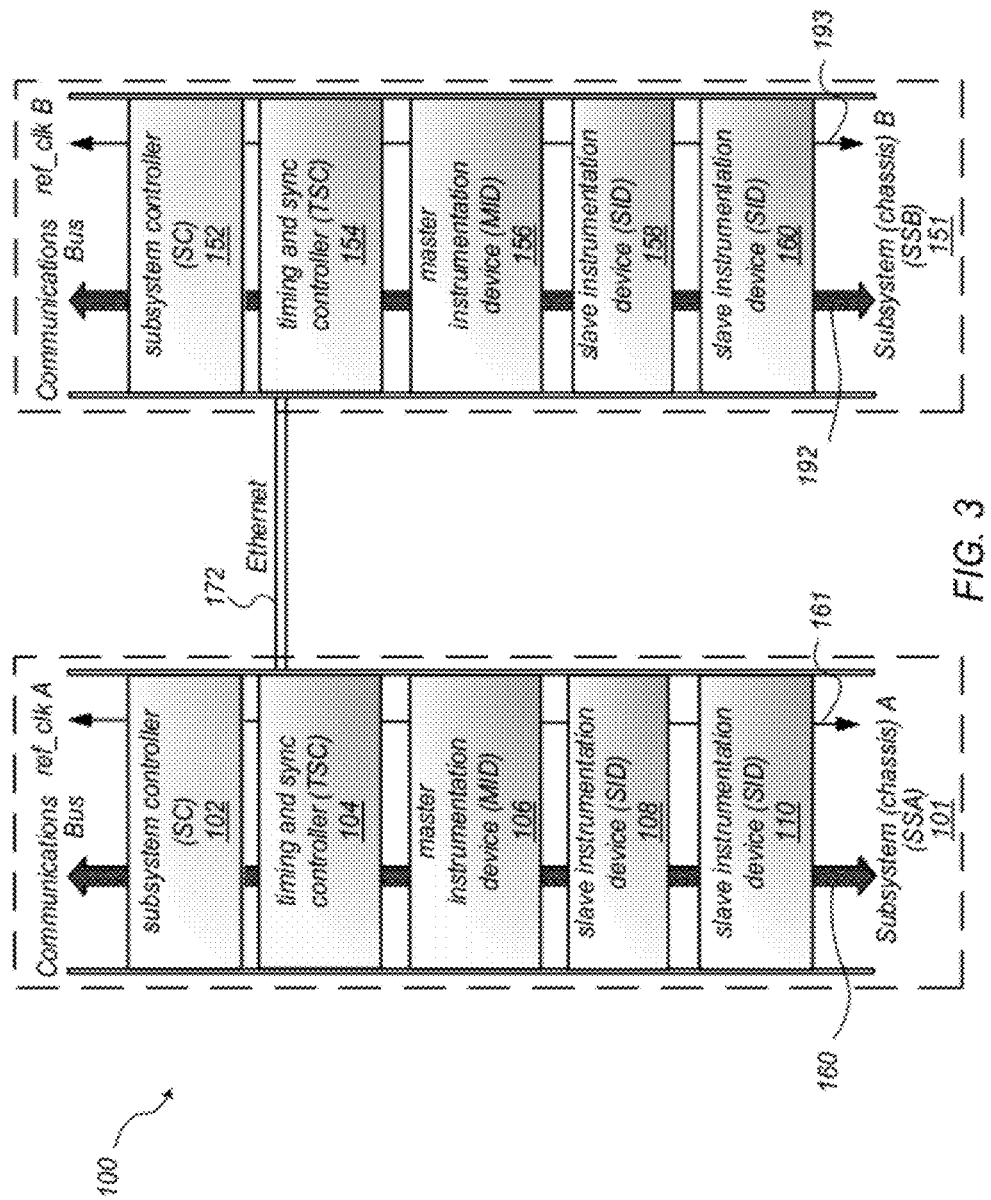
FIG. 3 is a more detailed block diagram of two subsystems, representing two instruments/devices from FIGS. 1 and 2, coupled together according to one embodiment.

FIG. 3 shows one embodiment of a simplified instrumentation system 100, which may be thought of as a simplified version of systems 10 and 60 from FIGS. 1 and 2, respectively. System 100 supports the synchronization, through a given synchronization protocol, of triggers (trigger signals or pulses) of multiple instrumentation devices across two subsystems 101 and 151. As shown in FIG. 3, subsystems 101 and 151, each of which may be representative of one of the instruments/devices (e.g. 24, 18) from FIG. 1, are shown connected to each other via a communications channel (e.g., network, wireless medium, a communications bus, etc). In one set of embodiments, each of subsystem 101 and 151 may be a chassis configured to receive multiple data acquisition cards operating as instrumentation devices. In FIG. 3, SSA 101 and SSB 151 are connected via Ethernet connection 172 serving as the communication channel. While FIG. 3 depicts only two subsystems, other embodiments may include more similar subsystems disposed and coupled in a manner similar to the configuration of subsystems 101 and 151. In addition, while subsystems 101 and 151 are coupled together via an Ethernet connection 172 as shown, in other embodiments the subsystems may be coupled to each via other means, as mentioned above, for example wirelessly, or via a combination of different communication channels.

In one set of embodiments, SSA 101 and SSB 151 are modular instrumentation subsystems, each disposed as a rack system referred to as a "chassis", where each chassis may contain multiple elements such as instrumentation units, which may be DAQ cards containing various instrumentation devices. The instrumentation units may be plugged into the chassis to form the subsystem. In depicted system 100, SSA 101 includes a first system controller (SC) 102, a first timing and synchronization controller (TSC) 104, a first master instrumentation device (MID) 106, a first slave instrumentation device (SID) 108, and a second SID 110. Also in depicted system 100, SSB 151 includes a second SC 152, a second TSC 154, a second MID 156, a third SID 158, and a fourth SID 160. Of course other configurations are possible with more or less instrumentation devices and/or controllers. Regardless of the number of devices and controllers present in a given subsystem, the controllers and devices in each subsystem may be considered "local" to that subsystem, and thus a "local controller" or "local device" within any given subsystem may refer to all controllers and devices configured in the subsystem. In this sense, devices in one subsystem will have different controllers than devices in another, different subsystem. Accordingly, synchronizing different subsystems to each other (or with respect to each other) may include one or more synchronizing steps, which may also include synchronizing local devices to each other within a given subsystem.

In some embodiments, each subsystem may be configured with a backplane, which may support one or more communications buses (e.g., PCI, PCI express, PXI etc.). As mentioned above, the instrumentation units may be circuit boards (e.g., cards, modules) that may be connected to the backplane and may communicate (e.g., via a backplane communications bus) with other circuit boards connected to the backplane. Instrumentation units may also have front panel input/output connectors that may support various types of communications (e.g., signaling, point-to-point communications) with other instrumentation units. For example, in system 100, SSA 101 may include communications bus 160 that may support communications between SC 102, TSC 104, MID 106, SID 108 and SID 110. The devices within instrumentation unit 101 may receive a common shared reference periodic signal, such as a clock signal (e.g., a backplane clock signal, a communications bus signal). For example, devices in SSA 101 may receive reference clock signal 161, which may be a clock signal for communications bus 116 (e.g. a 10 MHz clock signal). Clock 161 may be used to synchronize the operation of circuitry and the generation of signals on devices of SSA 101. Similarly, devices within SSB 151 may also receive a reference clock signal 193 which may be a clock signal for communications bus 192.

The Institute of Electrical and Electronics Engineers (IEEE) Standard 1588 defines a Precision Clock Synchronization Protocol for Networked Measurement and Control Systems. Standard 1588, or IEEE-1588 may be considered one example of what is referred to herein as a Precision Time Protocol (PTP), also referenced as a high-level synchronization protocol. A high-level synchronization protocol may be used to synchronize reference clocks 161 and 193 in SSA 101 and SSB 151, respectively, to millisecond accuracy with respect to each other. Accordingly, clock 161 of SSA 101 and clock 193 of SSB 151 may be phase aligned with respect to each other to where there is minimal skew, e.g. less than a millisecond, between corresponding rising edges. This way, the respective reference clocks (in this case 161 and 193) may be considered to be running in-phase with respect to each other in all the subsystems that are to be synchronized with respect to one another (in this example subsystems 101 and 151).

Therefore each subsystem controller (in this example TSC 104 and TSC 154) may be configured to support one or more PTPs, and by interfacing with a respective TSC (in the example shown, TSC 104 and 154, respectively) to control/program the TSC to generate future time events (FTEs) at specific future points in time. For example, under the control of SC 102 and SC 152, TSC 104 and TSC 154, respectively, may be capable of generating synchronization pulses and trigger pulses at specific edges of reference clocks 161 and 193, respectively. For example, TSC 154 may be programmed, for example through/by SC 152 to generate a pulse at the same specific future point in time and at a specific edge of reference clock 193 corresponding to the specific point in time. Furthermore, the pulse may be generated synchronously to an edge of clock 193 that corresponds to, and is phase aligned to the specific edge of clock 161, by virtue of reference clocks 161 and 193 having been aligned with respect to each other through the given PTP (which, again, may be implementation of IEEE-1588 protocol over Ethernet, or a GPS protocol through wireless communication, etc.)

Figure 4:
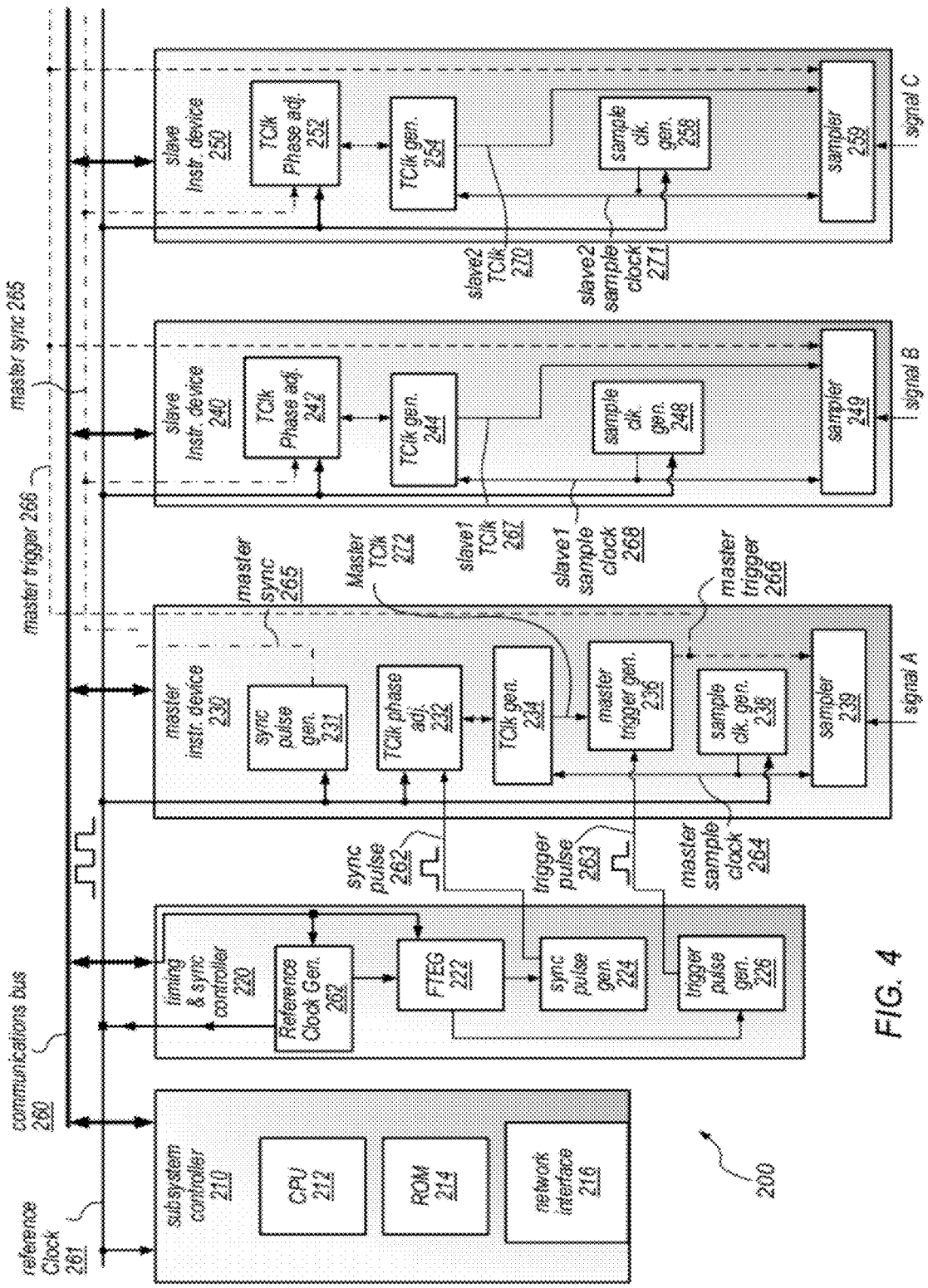
FIG. 4 is a block diagram of one embodiment of one of the subsystems from FIG. 3.

Turning now to FIG. 4, one possible embodiment 200 of a subsystem, which may be an embodiment of SSA 101 and/or SSB 151, is shown in more detail. Subsystem 200 may include a subsystem controller 210, a timing and synchronization controller 220, and various instrumentation devices (230, 240, and 250), one of which (230) may be designated as a master device. The three devices (230, 240, and 250) may be operated to sample respective analog signals A, B, and C, through respective sampler blocks (e.g. sampler circuitry) 239, 249, and 259. Timing and sync controller 220 may include a reference clock generator 262 to generate a local reference clock distributed to all the other devices (230, 240 and 250). Subsystem controller 210 may operate under control of CPU 212, and may include a ROM 214 to store program information and/or data, and a network interface to communicate with other similar subsystems, for example to use a high-level protocol to synchronize with other subsystems, as will be further described below. Communications bus 160 may be a backplane bus (e.g. PCI or PXI) and may couple together the controllers and devices to transfer data between the devices and controllers.

Devices 230, 240, and 250 may all receive the reference clock and generate a respective sample clock in respective sample clock generator blocks/circuits 238, 248, and 258. Devices 230, 240, and 250 may then use their respective sample clocks to generate respective trigger clocks in respective trigger clock generator blocks/circuits 234, 244, and 254. As previously mentioned, in order to enable multiple subsystems, such as subsystem 200, to operate synchronously, controller 210 may synchronize, through a PTP, the reference clock generated by clock generation block/circuit 262 with similar reference clocks generated in other similar subsystems. Either one of the subsystems, or a separate control center (e.g. in a computer such as computer 82 in FIGS. 1 and 2) may operate as the master device for implementing the PTP. For example, referring again to FIG. 3, SC 102 in SSA 101 may operate as the master device for the PTP, or another, external control system coupled to both SSA 101 and SSB 151 may operate as the master device for the PTP. Various embodiments may include other variations, implementing the PTP of choice to synchronize the respective reference clocks with respect to each other.

Therefore, timing and sync controller 220 may function as the central unit for synchronizing the various devices (230, 240, and 250) with respect to each other, and with (respect to) other similar subsystems. Accordingly, controller 220 may include clock generation block 262 to generate the backplane clock, that is, the local reference clock (more generally a local reference periodic signal) used by all controllers and devices within subsystem 200. As mentioned above, controller 210 may communicate with a master controller (e.g. a central computer, such as computer 82 in FIGS. 1 and 2, or another controller in a similar subsystem designated as the high-level master) through its network interface 216, using a PTP. Once the reference clocks such as reference clock 261 of subsystem 200 are in phase with respect to each other, the respective TClks of the master devices within different subsystems, such as TClk 272, may also be phase aligned with respect to each other.

Master device 230 may be configured to accept an external synchronization pulse (sync pulse) 262, which, in the embodiment shown, is provided by controller 220 through sync pulse generation block 224. Sync pulse 262 may be used to phase align the TClk generated by master device 230 to a specific edge of reference clock 261. Since reference clock 261 has already been phase aligned (with respect) to the respective similar reference clocks in other similar subsystems, if sync pulse 262 is generated at a specific point in time through the use of a PTP future time event, and is lined up to a specific rising edge of reference clock 261, the respective TClks generated by respective designated similar master devices of the different subsystems will be lined up with respect to each other. By asserting sync pulse 262, and similar sync pulses in the different participating subsystems, at a specific point in time, the respective master devices in all subsystems may see the sync pulse in the same reference clock period (in subsystem 200 this would a period of clock 261).

Figure 5:
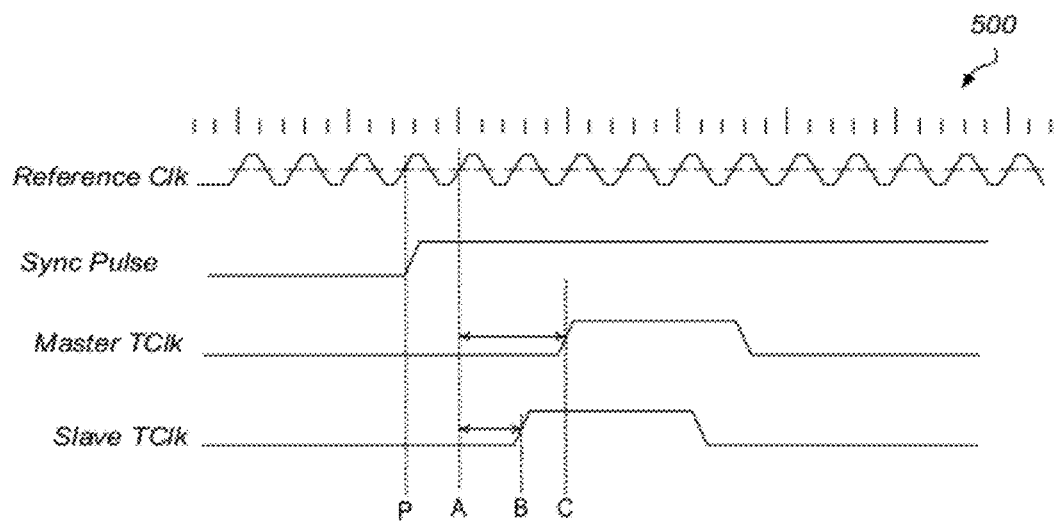
FIG. 5 shows a timing diagram illustrating the relationship between a master trigger clock, a slave trigger clock, and a synchronization pulse prior to synchronization of the master trigger clock to a specific edge of a reference clock, according to one embodiment.
Figure 6:
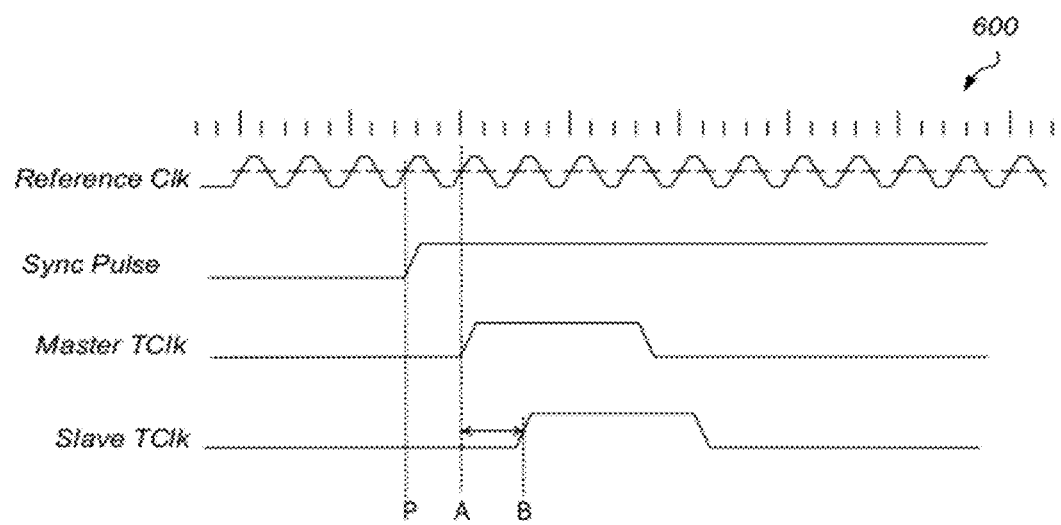
FIG. 6 shows a timing diagram illustrating the relationship between a master trigger clock, a slave trigger clock, and a synchronization pulse after the master trigger clock has been synchronized to a specific edge of a reference clock, according to one embodiment.

Timing diagram 500 in FIG. 5 illustrates how TClks between the respective master devices of different subsystems may be synchronized according to one embodiment. A Sync Pulse may be generated at a same specific point in time P in all controllers, as an established future time event. For example, controller 210 may program FTEG 222 by using the operating PTP to issue sync pulse 262 at a specific point in time, while a similar sync pulse in other subsystems may similarly be issued. As seen in FIG. 5, measurement of the TClk delay may begin on the next edge of the reference clock at time point A. The master TClks may then be aligned to the reference clock pulse that corresponds to the sync pulse, as shown in timing diagram 600, which shows the same waveforms as timing diagram 500, but just after the master TClk has been moved. Referring again to FIG. 4, this may be accomplished by phase adjustment block 232, which may receive sync pulse 262 and perform the measurement/adjustment to align TClk 272 as shown in FIG. 6. Once the master TClk has been aligned to the specific edge of the reference clock, the slave TClks (267 and 270 in subsystem 200) may be aligned to the master TClk (272 in subsystem 200). The slave TClks may be aligned in a similar manner, but with the sync pulse issued by the master device. For example, master device 230 may issue a sync pulse 265 through generator block 231, with respective slave TClk adjustment blocks 242 and 252 performing the required measurements/adjustments to adjust slave TClks 267 and 270 to the same edge A of reference clock 261. By adjusting all TClks within all respective subsystems in a similar manner, all master TClks and all slave TClks will be aligned with respect to each other across all participating subsystems.

Once the TClks, that is, the trigger clocks generated by all respective participating master devices and slave devices have been synchronized with respect to each other, all the subsystems, and accordingly all devices within the subsystems may be started together. Because it is possible for controllers (e.g. referring to FIG. 3, SC 102 and SC 152) to be physically separated, sharing a common physical trigger signal, intended to indicate the start of a data acquisition process for example, may not be possible. This may be overcome, however, by using the PTP to establish/program a future time event to start all the devices at the same point in time. Referring again to FIG. 4, FTEG 222 may be programmed to generate a trigger pulse 263 through pulse generator block 226, which may be provided to trigger generation block 236. The master device 230 may then generate a master trigger 266 based on trigger pulse 263 through trigger generation block 266, and propagate trigger 266 to all the slave devices (240 and 250 in subsystem 200). In order to provide as much time as possible for trigger 266 to propagate to all the slave devices, e.g. a time span close to a full TClk period, trigger pulse 263 may be issued right after a rising edge of TClk 272 (again, since all TClks have been synchronized, this would also correspond to a same rising edge of all TClks generated by participating devices). The future time event, or point in time, may be determined (e.g. calculated) based on the period of the TClk, which may be obtained for example by querying TClk software. Since the master TClk was aligned to the sync pulse, the valid times at which a start trigger may be sent, right after any edge of TClk, may be determined/calculated.

Figure 7:
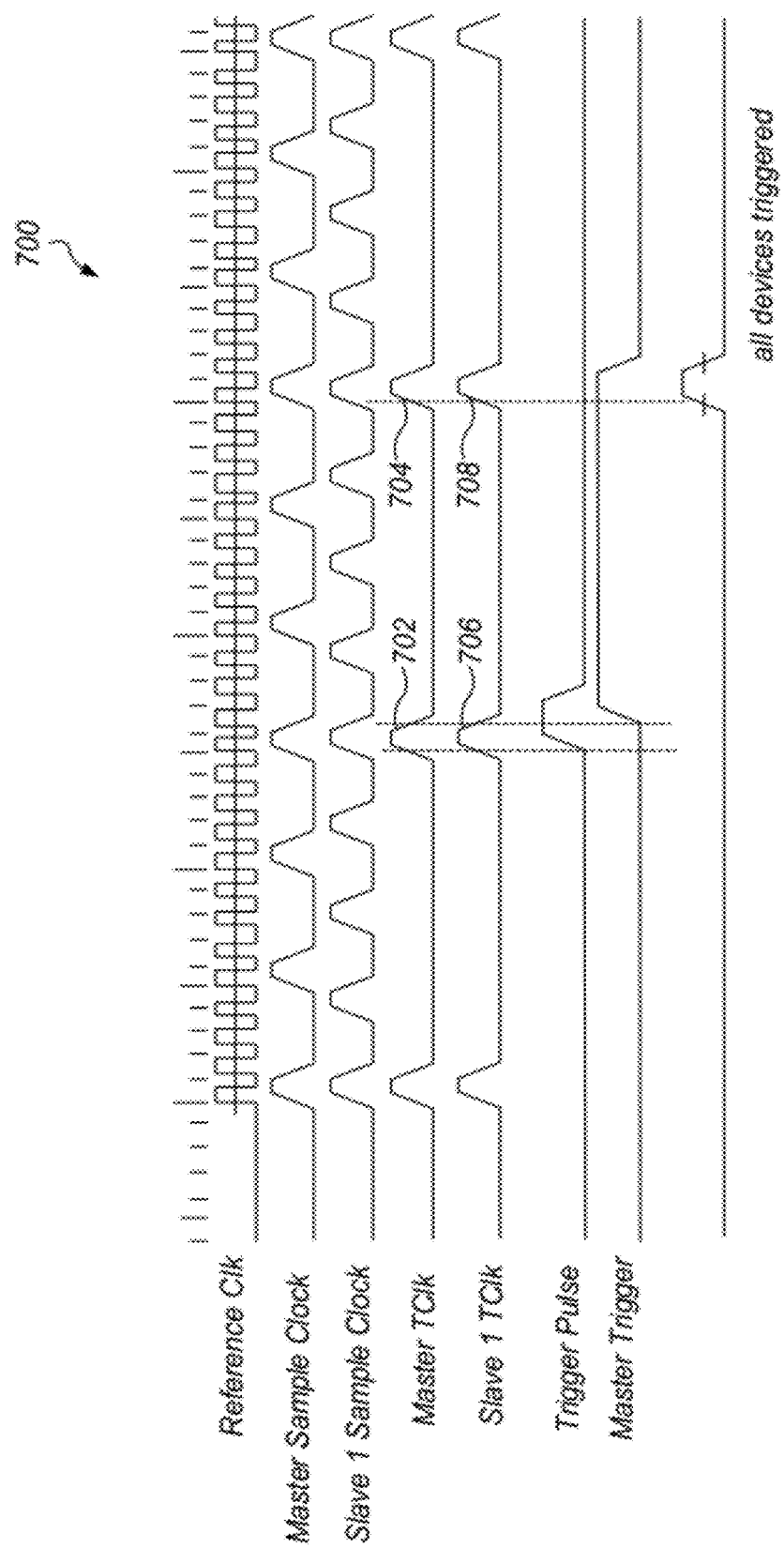
FIG. 7 shows a timing diagram illustrating the triggering of multiple devices using a distributed trigger pulse, according to one embodiment.

One example of how all devices may be started together is shown in timing diagram 700 in FIG. 7, with reference to the subsystem shown in FIG. 4. As mentioned above, based on information conveyed to FTEG 222, generator block 226 may generate the Trigger Pulse shown in FIG. 8 at a specific point in time. In a similar manner, respective trigger pulse generator blocks in all participating subsystems may generate a respective trigger pulse at the same point in time. For better understanding, reference is made only to subsystem 200 in FIG. 4, with the understanding that other participating subsystems may operate in a similar manner. As seen in FIG. 7, the sample clock frequency of master device 230 may be different than the sample clock frequency of slave device 240 (for example). The frequency of the TClks may be the same, and correspond to a lowest common multiple of the respective frequencies of the different sample clocks. Furthermore, the respective sample clocks may also be phase locked or phase aligned to the reference clock, as shown in FIG. 7. The Trigger Pulse may be generated at the specified point in time, shown in FIG. 7 as very shortly following the rising edge of TClk pulse(s) 702 (and 706). Thus, master device 230 may export the Trigger Pulse as the Master Trigger, on the falling edge of TClk pulse(s) 702 (and 706), allowing Master Trigger nearly a full TClk period to propagate to all the slave devices. All devices, including the master device, may then be triggered on the rising edge of TClk pulse(s) 704 (and 708), referenced as the "next rising" edge of TClk. Of course the manner in which the TClk pulse is used to recognize the Master Trigger is not tied to the rising edge of the TClk pulse, and alternate embodiments may feature other combinations of the TClk signals are used for recognizing the triggers, while retaining the essential timing relationships illustrated in FIG. 7. Accordingly, data acquisition may begin at that point by triggering/starting samplers 239, 249, and 259, for example, at the point when the Master Trigger is recognized.

Figure 8:
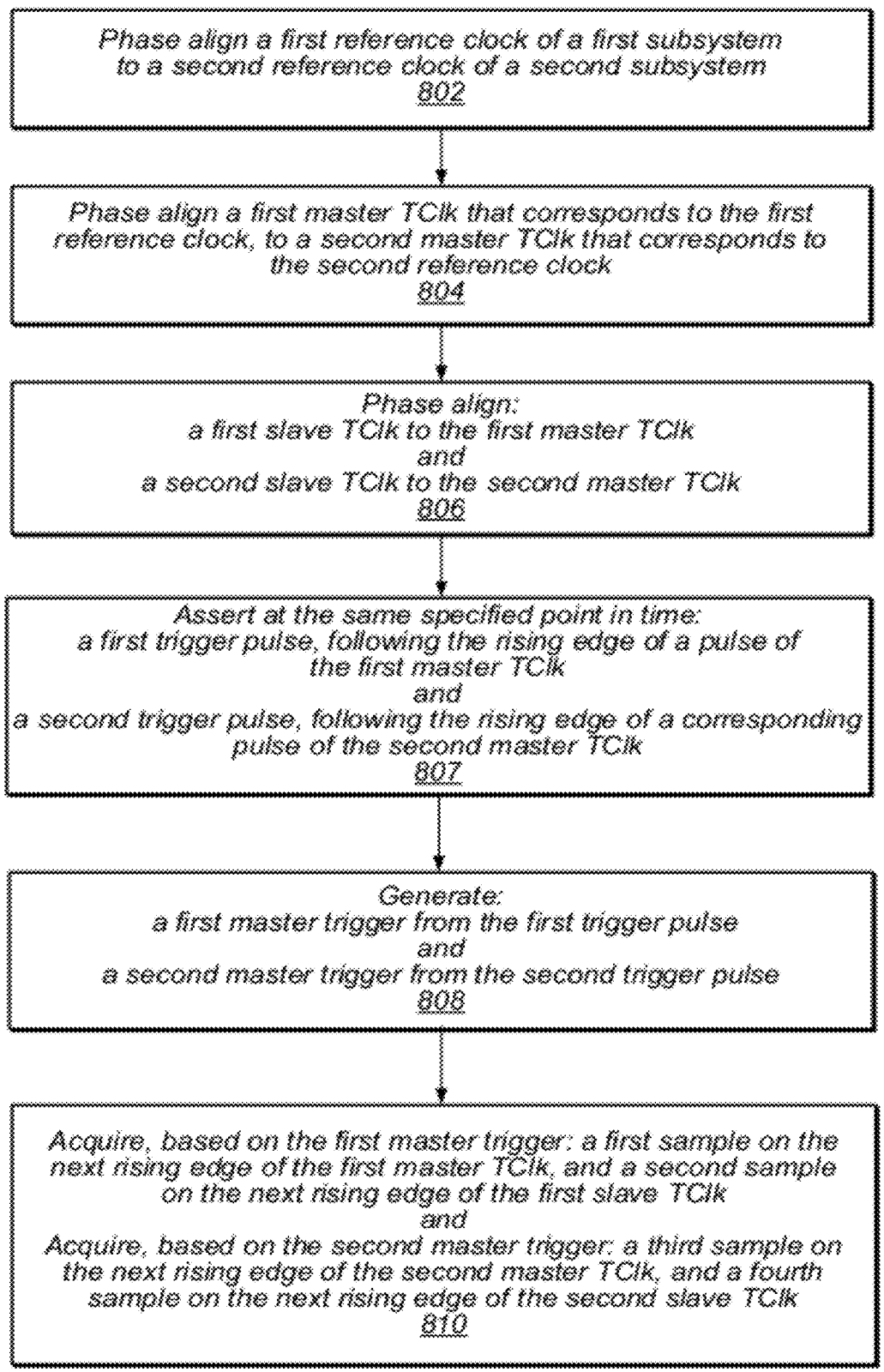
FIG. 8 shows a flow chart of a method for performing data acquisition according to one embodiment.

FIG. 8 shows a flow chart of a method for performing data acquisition with different subsystems synchronized with respect to each other, according to one embodiment. While the flow chart in FIG. 8 details only a minimum number of signals necessary to illustrated the basic methodology, one of ordinary skill in the art will appreciate how additional signals may be incorporated into the very same flow, according to the principles previously detailed above. Once each participating subsystem has been powered up/started, a first reference clock of a first subsystem may be phase aligned a to a second reference clock of a second subsystem (802), e.g. through the use of a high-level synchronization protocol (or PTP). Once the reference clocks have been phase aligned with respect to each other, a first master TClk that corresponds to the first reference clock may be phase aligned to a second master TClk that corresponds to the second reference clock (804). This may be accomplished by generating a future time event at the same point in time in the first subsystem and the second subsystem, where the future time event is the generation of a respective sync pulse in each subsystem, with the sync pulse used to phase align the respective master TClk to a specific edge of the corresponding reference clock. It should also be noted that as used herein, references to an edge of a clock or a clock signal are references to an edge of a pulse of the signal. Edges may be rising edges or falling edges, as long as the illustrated timing relationships between the various signals are maintained.

Once the respective master TClks have been aligned with respect to each other, a first slave TClk may be phase aligned to the first master TClk, and a second slave TClk may be phase aligned to the second master TClk (806). This may be accomplished by each respective master device generating a respective sync pulse, and use that respective sync pulse to phase align the respective slave TClk to the corresponding master TClk. Once all TClk signals have been thus phase aligned (with respect) to each other, various desired functions performed by devices in the two subsystems may be started at the same point in time. To accomplish this, a first trigger pulse (in the first subsystem) and a second trigger pulse (in the second subsystem) may both be asserted at the same specified point in time, which represents a point in time that follows the rising edge of a pulse of the first master TClk, and follows the rising edge of a corresponding pulse of the second master TClk (807). Upon receiving the respective trigger pulses, the first master device may generate a first master trigger from the first trigger pulse, and the second master device may generate a second master trigger from the second trigger pulse (808).

The master triggers may be propagated to the associated slave devices, and used to mark the synchronized starting point at which all devices begin performing a designated function, such as data acquisition, for example. Thus, based on the first master trigger, a first sample may be acquired according to the first master TClk, for example on a subsequent specified edge of a specified subsequent pulse of the first master TClk (e.g. the next rising edge) of the first master TClk (810). In a similar fashion, also based on the first master trigger, a second sample may be acquired according to the first slave TClk, for example on a subsequent specified edge of a specified subsequent pulse of the first slave TClk (e.g. the next rising edge) of the first slave TClk (810). At the same time, based on the second master trigger, a third sample may be acquired according to the second master TClk, for example on a subsequent specified edge of a specified subsequent pulse of the second master TClk (e.g. the next rising edge) of the second master TClk, and a fourth sample may be acquired according to the second slave TClk, for example on a subsequent specified edge of a specified subsequent pulse of the second slave TClk (e.g. the next rising edge) of the second slave TClk (810).

As described above, various functions, including but not limited to data acquisition, may be synchronized across multiple subsystems. The method shown in FIG. 8 represents one embodiment of how the synchronization principles described herein may be used in conjunction with any of the computer systems or devices shown in the above Figures to synchronize multiple subsystems with respect to each other. In various embodiments, some of the method elements shown may be omitted, performed concurrently, or performed in a different order than shown, when permitted. Additional method elements may also be performed as desired.

Embodiments of a subset or all (and portions or all) of the above may be implemented by program instructions stored in a memory medium or carrier medium and executed by a processor. A memory medium may include any of various types of memory devices or storage devices. The term "memory medium" is intended to include an installation medium, e.g., a Compact Disc Read Only Memory (CD-ROM), floppy disks, or tape device; a computer system memory or random access memory such as Dynamic Random Access Memory (DRAM), Double Data Rate Random Access Memory (DDR RAM), Static Random Access Memory (SRAM), Extended Data Out Random Access Memory (EDO RAM), Rambus Random Access Memory (RAM), etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer that connects to the first computer over a network, such as the Internet. In the latter instance, the second computer may provide program instructions to the first computer for execution. The term "memory medium" may include two or more memory mediums that may reside in different locations, e.g., in different computers that are connected over a network.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Although the embodiments above have been described in considerable detail, numerous variations and modifications will become apparent to those skilled in the art once the above disclosure is fully appreciated. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention, and the following claims are to be interpreted to embrace all such variations and modifications.

We claim:

1. A method for synchronizing multiple subsystems with respect to each other, the method comprising:
    phase aligning a first master clock signal of a first subsystem to a second master clock signal of a second subsystem;
    phase aligning a first slave clock signal of the first subsystem to the first master clock signal, and phase aligning a second slave clock signal of the second subsystem to the second master clock signal;
    asserting a first trigger pulse in the first subsystem and a second trigger pulse in the second subsystem at a same first point in time, subsequent to said phase aligning the first master clock signal and said phase aligning the second master clock signal;
    receiving the first trigger pulse, and in response to receiving the first trigger pulse:
        performing a first function using the first master clock signal; and
        performing a second function using the first slave clock signal; and
    receiving the second trigger pulse, and in response to receiving the second trigger pulse:
        performing a third function using the second master clock signal; and
        performing a fourth function using the second slave clock signal;
    wherein said performing the first, second, third, and fourth functions begin at a same second point in time.

2. The method of claim 1, further comprising:
    generating the first master clock signal based on a first reference clock signal of the first subsystem; and
    generating the second master clock signal based on a second reference clock signal of the first subsystem.

3. The method of claim 2, further comprising:
    prior to said phase aligning the first master clock signal to the second master clock signal, phase aligning the first reference clock signal to the second reference clock signal.

4. The method of claim 2, further comprising:
    generating a first sample clock signal from the first reference clock signal; and
    generating a second sample clock signal from the second reference clock signal.

5. The method of claim 2, wherein the first reference clock signal and the second reference clock signal have the same frequency.

6. The method of claim 2, further comprising:
    generating the first slave clock signal based on the first reference clock signal; and
    generating the second slave clock signal based on the second reference clock signal.

7. The method of claim 3, wherein said phase aligning the first reference clock signal to the second reference clock signal comprises phase aligning the first reference clock signal to the second reference clock signal using a high-level precision time protocol.

8. The method of claim 3, wherein said phase aligning the first master clock signal to the second master clock signal comprises:
    aligning the first master clock signal to a specified edge of a specified pulse of the first reference signal, corresponding to a third point in time; and
    aligning the second master clock signal to a specified edge of a specified pulse of the second reference signal, corresponding to the third point in time.

9. The method of claim 4, wherein said performing the first function comprises acquiring data samples according to the first sample clock signal, and/or wherein said performing the second function comprises acquiring data samples according to the second sample clock signal.

10. The method of claim 4, wherein the first sample clock signal and the second sample clock signal have different frequencies.

11. The method of claim 4, wherein said generating the first master clock signals comprises generating the first master clock signal from the first sample clock signal, and said generating the second master clock signals comprises generating the second master clock signal from the second sample clock signal;
    wherein the first master clock signal and the second master clock signal have the same frequency, which is a common multiple of the frequency of the first sample clock signal and the frequency of the second sample clock signal.

12. The method of claim 7, wherein the high-level precision time protocol is one of:
    IEEE-1588 protocol; and
    global positioning system protocol.

13. The method of claim 8, further comprising generating a first synchronization pulse in the first subsystem and a second synchronization pulse in the second subsystem at a same fourth point in time;
    wherein said aligning the first master clock signal comprises receiving the first synchronization pulse, and in response to receiving the first synchronization pulse adjusting the first master clock signal until it is aligned with the specified edge of the specified pulse of the first reference signal; and/or
    wherein said aligning the second master clock signal comprises receiving the second synchronization pulse, and in response to receiving the first synchronization pulse adjusting the second master clock signal until it is aligned with the specified edge of the specified pulse of the second reference signal.

14. A method for operating multiple subsystems synchronously with respect to each other, the method comprising:
    phase aligning a first master clock signal of a first subsystem to a second master clock signal of a second subsystem;

asserting a first trigger pulse in the first subsystem and a second trigger pulse in the second subsystem at a same first point in time, subsequent to said phase aligning the first master clock signal and said phase aligning the second master clock signal;

receiving the first trigger pulse, and in response to receiving the first trigger pulse performing a first function using the first master clock signal; and receiving the second trigger pulse, and in response to receiving the second trigger pulse performing a second function using the second master clock signal;

wherein said performing the first function and said performing the second function are both started at a same second point in time.

15. The method of claim 14, further comprising:

generating a first reference clock signal in the first subsystem and generating a second reference clock signal in the second subsystem;

generating a first sample clock signal from the first reference signal and generating a second sample clock signal from the second reference signal; and generating the first master clock signal from the first sample clock signal and generating the second master clock signal from the second sample clock signal.

16. The method of claim 14, wherein said asserting the first trigger pulse comprises asserting the first trigger pulse subsequent and close to a rising edge of a pulse of the first master clock signal corresponding to the first point in time, and wherein said asserting the second trigger pulse comprises asserting the second trigger pulse subsequent and close to a rising edge of a pulse of the second master clock signal corresponding to the first point in time.

17. The method of claim 15, wherein the first reference clock signal and the second reference clock signal have the same frequency;

wherein the first sample clock signal and the second sample clock signal have different frequencies; and wherein the first master clock signal and the second master clock signal have the same frequency that is a common multiple of the frequency of the first sample clock signal and the frequency of the second sample clock signal.

18. The method of claim 16, further comprising:

generating a first master trigger pulse from the first trigger pulse on a falling edge of the pulse of the first master clock signal corresponding to the first point in time; and generating a second master trigger pulse from the second trigger pulse on a falling edge of the pulse of the second master clock signal corresponding to the first point in time;

wherein a next pulse of the first master clock signal following the pulse of the first master clock signal corresponding to the first point in time corresponds to the second point in time; and wherein a next pulse of the second master clock signal following the pulse of the second master clock signal corresponding to the first point in time corresponds to the second point in time.

19. The method of claim 15, further comprising phase aligning the first reference clock signal to the second reference clock signal prior to said phase aligning the first master clock signal to the second master clock signal.

20. A method for synchronizing multiple subsystems with respect to each other, the method comprising:

generating a first reference clock signal in a first subsystem and generating a second reference clock signal in a second subsystem, wherein the first subsystem and the second subsystem are coupled together by a communications channel;

generating a first master clock signal and a second master clock signal;

phase aligning the first reference clock signal to the second reference clock signal using a high-level synchronization protocol over the communications channel;

issuing a first synchronization pulse in the first subsystem and a second synchronization pulse in the second subsystem at a same first point in time;

recognizing the first synchronization pulse, and in response to recognizing the first synchronization pulse, adjusting the first master clock signal to align with a specified edge of a specified pulse of the first reference clock signal corresponding to the first point in time; and recognizing the second synchronization pulse, and in response to recognizing the second synchronization pulse, adjusting the second master clock signal to align with a specified edge of a specified pulse of the second reference clock signal corresponding to the first point in time;

wherein said adjusting the first master clock signal and said adjusting the second master clock signal result in the first master clock signal and the second master clock signal being phase aligned with respect to each other.

21. The method of claim 20, wherein said generating the first master clock signal comprises generating the first master clock signal based on the first reference clock signal, and wherein said generating the second master clock signal comprises generating the second master clock signal based on the second reference clock signal.

22. The method of claim 20, wherein the first reference clock signal and the second reference clock signal have the same frequency, and wherein the first master clock signal and the second master clock signal have the same frequency.

23. The method of claim 20, further comprising using the first master clock signal and the second master clock signal to recognize start of event triggers, to simultaneously start performing respective functions in the first subsystem and the second subsystem.

24. The method of claim 20, further comprising:

programming a first future time event into the first subsystem via the high-level synchronization protocol; and programming a second future time event into the second subsystem via the high-level synchronization protocol;

wherein the first future time event comprises said issuing the first synchronization pulse, and wherein the second future time event comprises said issuing the second synchronization pulse.

25. A subsystem comprising:

a timing controller configured to:

generate a reference clock signal;

receive first programming information usable to generate a first future time event at a specified first point in time; and generate the first future time event at the specified first point in time as instructed by the first programming information, and synchronously with the reference clock signal; and a first device configured to:

generate a first trigger clock signal;

recognize the first future time event generated by the timing controller, and, responsive to recognizing the first future time event, adjust the first trigger clock signal to phase align the first trigger clock signal to a specified edge of a specified first pulse of the reference clock signal corresponding to the specified first point in time.

26. The subsystem of claim 25, wherein the first device is further configured to:
    upon recognizing the first future time event, determine a time delay between the specified edge of the specified pulse of the reference clock signal and a specified edge of a specified pulse of the first trigger clock signal occurring in time after the specified edge of the specified pulse of the reference clock signal; and
    adjust the first trigger clock signal based on the determined time delay.

27. The subsystem of claim 25, wherein timing controller is configured issue a synchronization pulse on a specified edge of a specified second pulse of the reference clock signal corresponding to the specified first point in time, as part of generating the first future time event.

28. The subsystem of claim 25, further comprising a subsystem controller configured to:
    receive timing information from outside the subsystem;
    determine the first programming information based on the received timing information; and
    transmit the first programming information to the timing controller.

29. The subsystem of claim 25;
    wherein the timing controller is further configured to:
    receive second programming information usable to generate a second future time event at a specified second point in time, wherein the specified second point in time corresponds to a first pulse of the first trigger clock signal; and
    generate the second future time event at the specified second point in time as instructed by the second programming information;
    wherein the first device is further configured to:
    recognize the second future time event generated by the timing controller, and as a result of recognizing the second future time event, start performing one or more functions at a specific third point in time occurring in time after the specified second point in time, and synchronously with the first trigger clock signal.

30. The subsystem of claim 27, wherein the first device is configured to recognize the synchronization pulse as part of recognizing the first future time event, and adjust the first trigger clock signal to phase align the first trigger clock signal to the specified edge of the specified first pulse of the reference clock signal in response to recognizing the synchronization pulse.

31. The subsystem of claim 28, wherein the subsystem controller is configured to receive the timing information through a high-level precision time protocol from a system external to the subsystem.

32. The subsystem of claim 29;
    wherein the first device is further configured to start performing the one or more functions on a specified edge of a second pulse of the first trigger clock signal corresponding to the specific third point in time.

33. The subsystem of claim 29, wherein timing controller is configured issue a trigger pulse subsequent to the rising edge of the first pulse of the first trigger clock signal, in generating the second future time event.

34. The subsystem of claim 29, wherein the first device is further configured to:
    upon recognizing the second future time event, generate a trigger pulse on a specified edge of the first pulse of the first trigger clock signal;
    recognize the trigger pulse on a specified edge of a next pulse of the first trigger clock signal occurring after the first pulse of the first trigger clock signal; and
    start performing the one or more functions upon recognizing the trigger pulse.

35. The subsystem of claim 29, further comprising a subsystem controller configured to:
    receive timing information from outside the subsystem;
    determine the first programming information and second programming information based on the received timing information; and
    transmit the first programming information and second programming information to the timing controller.

36. The subsystem of claim 29, wherein the one or more functions comprise obtaining data samples.

37. The subsystem of claim 34, further comprising a second device configured to:
    generate a second trigger clock signal and align the second trigger clock signal to the first trigger clock signal, the second trigger clock signal thereby having a first pulse occurring at a same point in time as the first pulse of the first trigger clock signal;
    recognize the trigger pulse on a specified edge of a next pulse of the second trigger clock signal occurring after the first pulse of the second trigger clock signal; and
    start performing one or more functions upon recognizing the trigger pulse.

38. The subsystem of claim 35, wherein the subsystem controller is configured to receive the timing information through a high-level precision time protocol from a system external to the subsystem.

39. A system comprising:
    a plurality of subsystems coupled to each other via a communications link, wherein each subsystem of the plurality of subsystems is configured to:
    generate a local reference clock signal and a local first trigger clock signal;
    receive timing information over the communications link;
    based on the received timing information, generate first local programming information usable to generate a first local future time event at a specified first point in time;
    generate the first local future time event at the specified first point in time as instructed by the first local programming information, and synchronously with the local reference clock signal; and
    recognize the first local future time event, and a result of recognizing the first local future time event adjust the first local trigger clock signal to phase align the first local trigger clock signal to a specified edge of a specified first pulse of the local reference clock signal corresponding to the specified first point in time;
    wherein each subsystem phase aligning its respective first local trigger clock signal to the specified edge of the specified first pulse of the subsystem's local reference clock signal results in the respective first local trigger clock signals of the plurality of subsystems being phase aligned to each other.

40. The system of claim 39, wherein a first subsystem of the plurality of subsystems is configured to operate as a master subsystem for implementing a high-level precision time protocol, wherein the master subsystem is configured to generate and transmit the timing information to each of the remaining subsystems of the plurality of subsystems.

* * * * *